United States Patent
Castrillo et al.

(10) Patent No.: US 7,291,274 B2
(45) Date of Patent: Nov. 6, 2007

(54) METHOD OF DEIONISING AND CLARIFYING THE AQUEOUS MEDIUM USED IN AN ELECTRICAL DISCHARGE MACHINE AND THE PRODUCT USED IN SAID METHOD

(75) Inventors: Koldobika Castrillo, Bilbao (ES); Fernando Martinez, Aia (ES); Raquel Ferret, Vitoria (ES); Ana Aranzabe, Leioa (ES)

(73) Assignee: Ona Electro-Erosion, S.A., Durango (Bizkaia) (ES)

( * ) Notice: Subject to any disclaimer, the term of this patent is extended or adjusted under 35 U.S.C. 154(b) by 492 days.

(21) Appl. No.: 10/488,090

(22) PCT Filed: Dec. 20, 2001

(86) PCT No.: PCT/ES01/00496

§ 371 (c)(1),
(2), (4) Date: Feb. 23, 2004

(87) PCT Pub. No.: WO03/053861

PCT Pub. Date: Jul. 3, 2003

(65) Prior Publication Data

US 2004/0238457 A1 Dec. 2, 2004

(51) Int. Cl.
*C02F 1/42* (2006.01)
*B23H 3/10* (2006.01)

(52) U.S. Cl. .............. 210/685; 205/682; 205/684; 219/69.14; 204/522; 204/536

(58) Field of Classification Search ............... 210/638, 210/684, 685, 663, 669, 805; 423/304, 316, 423/692; 219/68, 69.1, 69.11, 69.14; 252/175, 252/597, 79.2, 79.4; 510/408, 434, 477, 510/175, 488; 205/674–677, 682, 684; 204/522, 204/536; 438/692; 562/597

See application file for complete search history.

(56) References Cited

U.S. PATENT DOCUMENTS

| 2,645,635 | A | * | 7/1953 | Walton ........................ 423/34 |
| 4,584,450 | A | * | 4/1986 | Inoue ...................... 219/69.17 |
| 4,683,074 | A | * | 7/1987 | Malik et al. ................. 510/434 |
| 4,737,541 | A | * | 4/1988 | Stavenger et al. .......... 524/547 |
| 6,503,875 | B1 | * | 1/2003 | Olson et al. ................ 510/346 |
| 2003/0013387 | A1 | * | 1/2003 | Tsai et al. .................... 451/41 |

OTHER PUBLICATIONS

Provisional Application 60/305,314, Tsai et al, filed Jul. 13, 2001, Specification and Claims.*

U.S. Appl. No. 60/305,314, Tsai et al, filed Jul. 13, 2001, Specification and Claims.*

* cited by examiner

*Primary Examiner*—Joseph Drodge
(74) *Attorney, Agent, or Firm*—Lucas & Merchanti, LLP

(57) ABSTRACT

Deionisation and clarification process of the aqueous medium used in an electroerosion machine and product for this process, where the electroerosion machines are comprised of a purification circuit for this aqueous medium, which includes an ion exchange phase between some cationic and anionic resins with the aqueous dielectric medium, which has a conductivity of less than 40 µS/cm, and to which a solution of oxalic acid and phosphoric acid in distilled/deionised water is added in the approximate proportion of oxalic acid between 0.18 and 0.035 moles and phosphoric acid between 1.28 and 2.5 moles per liter of solution.

12 Claims, 2 Drawing Sheets

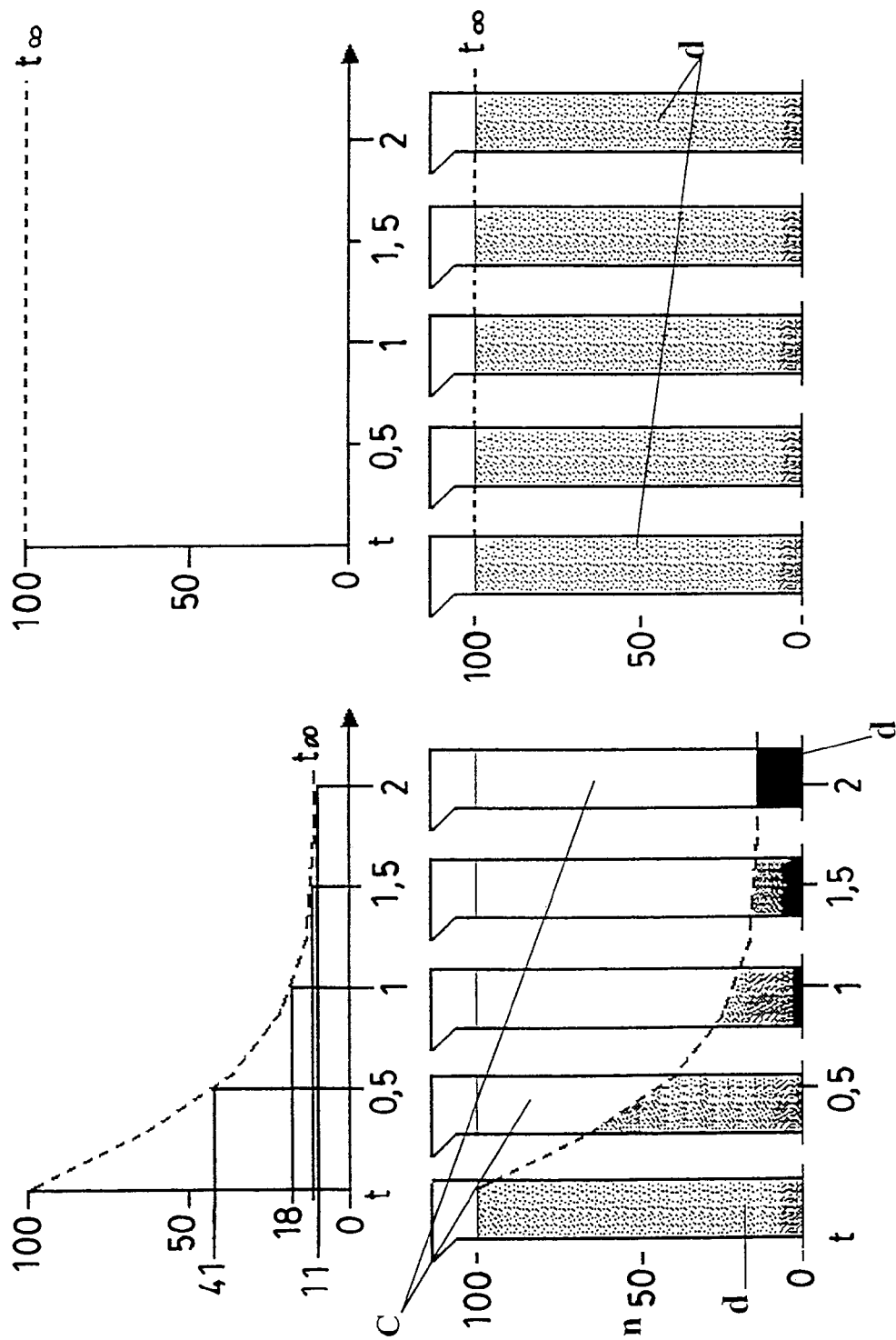

ND OF DEIONISING AND CLARIFYING THE AQUEOUS MEDIUM USED IN AN ELECTRICAL DISCHARGE MACHINE AND THE PRODUCT USED IN SAID METHOD

The wire electroerosion process normally involves the use of a wire that may be brass, steel, copper, etc., the part to be worked, which is usually a conductor part, for example, steel, aluminium, copper, titanium, etc. and an aqueous low conductivity working medium, free from particles in suspension, for example a dielectric medium comprised of filtered, cooled and partially deionised water. From the chemical viewpoint, there is a very large number of reactions that might take place between the different substances and compounds during a wire electroerosion process in aqueous medium.

Generally, as a result of the electroerosion process a progressive increase of the conductivity of the medium takes place. This increase is due to the oxide-reduction reactions and acid-base reactions, which take place basically between the metal that comprises the part to be worked and the dielectric medium that surrounds them, generally water. The electrical discharge generates a current of electrons that causes the formation of ions coming both from the water and from the part and the wire, but basically from the part to be worked. This increase in conductivity is controlled with a mixed system of (cationic and anionic) resins, which exchanges the ions with the medium. The price of the cationic-anionic resins is relatively high and their recovery in an ecological mode is relatively complicated, so deionisation, using only resins, becomes an expensive process.

On the other hand, it is known that the electroerosion process assumes the oxidation of the metal iron ($Fe^0$) as a result of a redox reaction with the water during the discharge. The iron changes from $Fe^0$ to $Fe^{2+}$ and to $Fe^{3+}$, this latter species in contact with the water reaches the acid-base equilibrium, precipitating in the form of hydroxide to pH above 2. The $Fe(OH)_3$ hydroxide is a dark gelatinous precipitate, with colloidal behaviour, which does not have the tendency to deposit but to remain in suspension, which is translated into a darkening of the water of the clean tank of the filtering system, which is not able to retain it.

The electroerosion process entails a continuous basification of the medium (initially, neutral partially deionised water). This increase in pH is due to the redox process of the water during the exchange of electrons. To compensate the oxidation of the iron the water is reduced (reduction of oxygen and hydrogen), which, in a neutral or alkaline medium, means an increase of the concentration of $OH^-$ in the medium. Part of this reacts to form the hydroxides of the relative metals but a surplus remains, which maintains the basic medium.

In addition, the electroerosion wire must pass, to be guided, through some extremely precise openings, in microns ($\mu m$). These openings get blocked due to the deposition of complicated complexes of the metals eroded during the process and with this the elements that comprise the wire guides and the precision of the electroerosion on the part to be worked are deteriorated.

The applicant considers that the essence of all these problems resides in the fact that the dissolution of the metals Fe, Cu, Al of the parts to be worked, is extremely quick in low conductivity media, (lower than 40 $\mu S/cm$) the maximum example is the change from $Fe^0$ to $Fe^{++}$ and to $Fe^{+++}$, so the solution is to find a medium that eliminates the first oxidation of the metal, for example, $Fe^{++}$ and acts quickly to prevent, if the second oxidation, $Fe^{++} \rightarrow Fe^{+++}$ takes place, this from giving rise to hydroxide.

At the same time, this medium-solution will control the ion concentration in the medium and therefore the conductivity, permitting a slower increase of same and a smaller consumption of resins. All of this must be possible with a medium that does not affect the electroerosion process in itself (start capacity, spark power, etc.) and which, apart from palliating the resin consumption, makes the filtering and the extraction and dehydration of the sludge easier, due to the absence of colloidal behaviour particles, such as the Fe hydroxide (OH)3.

The applicant considers that this medium-solution is a mixture of synergic action based on the union of an organic acid, used for its complexing capacity (oxalic acid) and an inorganic acid, used for its precipitating capacity (phosphoric acid), which acts upon the main cations present in the system. This mixture acts upon the precipitation of the metal hydroxide, the conductivity of the medium and on the pH of the system.

In addition, the oxalic acid presents a high tendency to form stable complexes, especially with the iron. In this way, the addition of oxalic acts upon the $Fe^{++}$ precipitating part of it and in addition, it is able to precipitate in reaction with the zinc and copper ($Cu^{++}$) which are dissolved in the dielectric medium. This action reduces the conductivity of the dielectric medium, as well as the trivalent iron concentration formed.

As the presence of $Fe^{+++}$ is unavoidable, the mixture is completed with phosphoric acid, capable of making precipitation quickly in the form of $FePO_4$. avoiding the formation of colloid particles, which are very difficult to filter and separate the $Fe^{+++}$ also forms stable complexes both with the oxalate ion and with the acid phosphate.

Apart from acting upon the formation of trivalent iron, the mixture influences the conductivity, which is provoked by the speed at which the particles charged in the dielectric medium move. These charged particles are small-sized anions and cations ($H^+$, $OH^-$, $Fe^{3+}$, $Fe^{2+}$, $Cu^+$, etc.), which can be found solvated by the medium.

If the aim is to reduce or prevent the increase of the conductivity, the chemical solution means, on the one hand, generating interactions between the charged particles (which reduces the conductivity) and at the same time reducing the mobility of the ions, for example creating particles that tend to draw the solution that surrounds them. In this way, the nearby ions have to move in crosscurrent and not in a stationary medium, losing the ease of movement respect to when they move separately and with low concentration. Thus, it is preferable to choose the large polar-nature charged particles, such as oxalic acid, which will draw a large cloud of solvation.

Although the acid mixture presents a very acid pH value, the constant basification, which the electroerosion process causes, compensates the acidity, maintaining the medium around the neutrality.

As a result of the chemical activity of the oxalic/phosphoric mixture, a large part of the charged ions precipitate as salts, which means their elimination from the medium by the action of the filter. The remaining charged species are transformed into stable complexes, much larger molecules, which reduce their mobility and therefore reduce their contribution to the conductivity of the medium.

Collaterally, the oxalic-phosphoric mixture dissolves the deposits and coatings formed in the electroerosion wire conduction openings, so the precision of the wire guiding increases.

To better understand the subject of this invention, a preferential form of practical execution is illustrated on the drawings, which is subject to accessory changes that take nothing away from its foundation.

FIG. 3 is a coordinate illustration of the sedimentation of the water solutes coming from the electroerosion in a known normal process.

FIG. 4 is a coordinate illustration like those of FIG. 3, of the sedimentation of the solutes of the water coming from electroerosion in accordance with the process and product targeted by the invention.

FIGS. 3 and 4 correspond to sedimentation tests performed in two 100 mm high test tubes and with a content of 100 milliliters, which have been filled with water coming from the electroerosion, whose conductivity is $10\infty$S/cm and which contain 10 mm$^3$ steel in suspension each one (the aspect of the water inside the two receptacles is totally black).

The liquid of FIG. 4 has been treated with the solution targeted by the invention and its content in the mixture is less than 0.07 milliliters.

FIG. 3 shows a permanently black liquid, which does not sediment in time.

FIG. 4 shows the sedimentation speed of the content, which after 2 hours, has totally sedimented and the water looks clean and can be recycled for use.

For the purification of the aqueous medium used in an electroerosion machine there is usually a purification circuit, which, based on the work tank in which the relative (normally metallic) part is worked and which contains the aqueous medium (normally low conductivity water), transports the now contaminated aqueous medium to a receiving tank, from where it is sent to the filter and to the ion exchanger by means of cationic-anionic resins, to get the water to reach the deionisation degree required by the process, so directly/indirectly this water can return to the work tank and start the cycle.

This process and product is used with water with a conductivity of less than 40 μS/cm and preferably with waters with a conductivity of less than 20 μS/cm.

A non-limiting example of a practical execution of this invention is described below.

The aqueous medium where the electroerosion work is carried out normally has low conductivity. As ions are originated in the process, cationic-anionic resins are used to eliminate the ions, or as occurs in reality, to maintain the aqueous medium with the required conductivity (depending on each case) for example, in FIG. 1 the conductivity remains below 14 μS/cm.

The aqueous medium begins with an initial conductivity ($C_1$), for example 11 μS/cm, and it is charged with ions until a limit conductivity is reached ($C_2$), for example 14 μS/cm, which is the prefixed quantity for the cationic-anionic resins (R), which lower the conductivity from 14 μS/cm to 11 μS/cm start to work, and the process starts again. Normal work conditions, in rough-down system, may be, working a steel, aluminium, copper or titanium part, with a material start of 1500 and 3000 mm$^3$/hour.

The process cycle time ($t_1$), which the aqueous medium takes to change from the initial conductivity ($C_1$) of 11 μS/cm to a limit conductivity ($C_2$) at 14 μS/cm and return to the initial conductivity ($C_1$) may be about 15 minutes.

Figure 2:
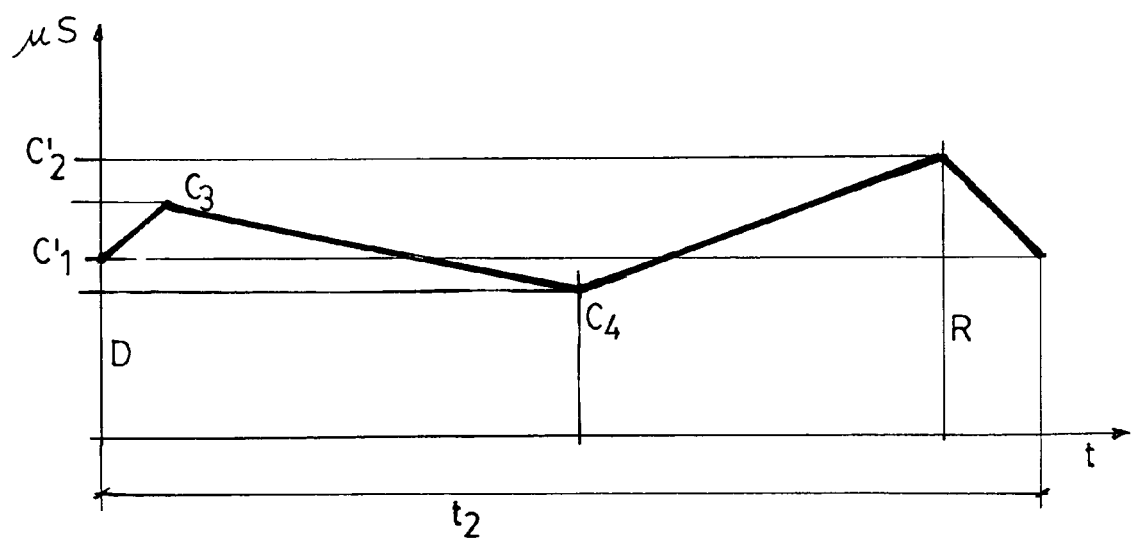
FIG. 2 is the illustration of FIG. 1 in accordance with a practical execution of the process targeted by the invention.

The tests performed (FIG. 2) with oxalic and phosphoric acid mixtures indicate that extensive variations in the proportions of both components of the mixture offer results that improve what is known until now, but the applicant considers that clearly favourable results occur with mixtures where the oxalic acid is between 0.018 and 0.035 moles and the phosphoric acid between 1.28 and 2.5 moles per liter of solution in distilled or deionised water, for example less than 10 μS/cm.

EXAMPLE

A solution (D) is prepared of a mixture of 3.15 grams oxalic acid $C_2O_4H_2$, that is, 0.025 M (mole), 0.1 liters of phosphoric acid $PO_4H_3$, that is, 1.8 M (mole) and the rest up to 1 liter of deionised water whose conductivity was 7 μS/cm.

Figure 1:
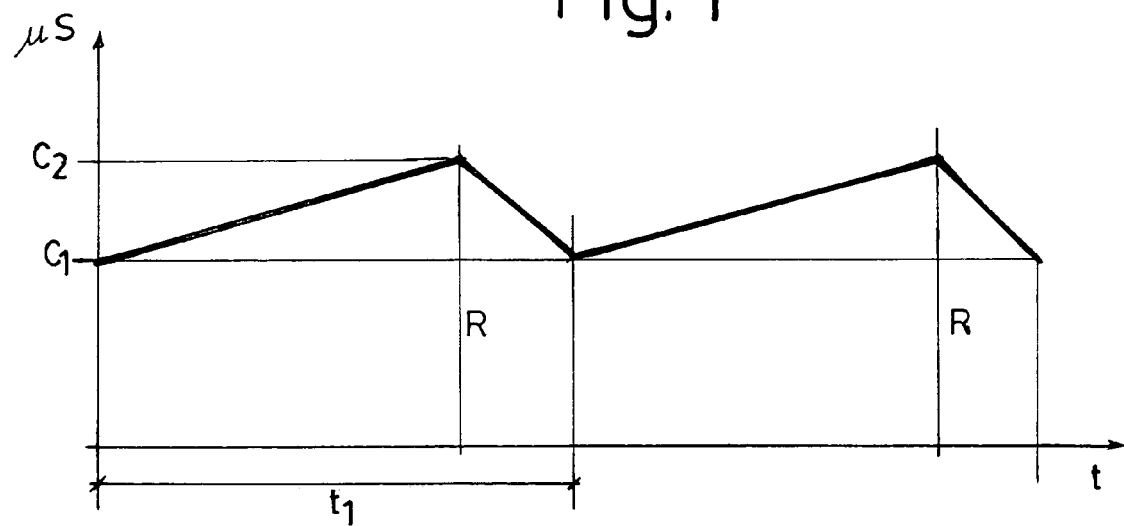
FIG. 1 is an coordinate illustration of a normal known deionisation process with cationic-anionic resins.

A steel part to be worked was used, using a work system with a material start of 2160 mm$^3$/hour (identical to that of FIG. 1, to be able to carry out a suitable comparison).

The test was started with an initial conductivity ($C_1'$) of the aqueous medium of 11 μS/cm and a limit conductivity ($C_2'$) was established for the entry into the cationic-anionic resin (R) phase of 14 μS/cm.

7 ml of the prepared solution (D) were added to the aqueous medium. The conductivity increased to a maximum ($C_3$) of 12 μS/cm, and then it began to gradually drop to a minimum ($C_4$) of 10 μS/cm, to start going up until it reached the limit conductivity ($C_2'$) letting the resins (R) enter with their work to return the aqueous medium from the limit conductivity ($C_2'$) to the initial conductivity ($C_1'$) and start the process again. The process cycle time ($t_2$) is around 30 minutes, that is, approximately double that necessary in the normal operation known, described above.

It is clearly seen that under equal conditions, the normal process known (FIG. 1) makes the resins (R) work twice every 30 minutes, whilst in the invention process (FIG. 2) the resins (R) only work once every 30 minutes, which means an increase of 100% in the life of the resins (R).

The test with aluminium parts gave similar results.

The tests with copper parts forced the quantity of solution to be used to be substantially increased, 1.5 ml being sufficient for a quantity of reduced Cu approximately equal to half that in the case of the steel, using a similar rough-down system to that used for the steel.

It must be taken into account that the electroerosion machine manufacturers supply technological tables where the start speed are indicated, from where the volumes of material reduced by unit of time in each working system can be deduced.

The solution can be added at any point of the aqueous medium purification circuit, but it is preferably added to the receiving tank of the dielectric aqueous medium already used which comes from the work tank.

In FIGS. 3 and 4 the coordinates are sedimentation height (h) in mm, time (t) in hours and level (n) of the interphase between the clean liquid (c) and the dirty liquid (d).

The invention claimed is:

1. A deionisation and clarification process for an aqueous medium used in an electroerosion machine comprising: circulating the aqueous medium in a purification circuit for the aqueous medium where an ion exchange phase is included between cationic and anionic resins with an aqueous dielectric medium; and adding to the purification circuit a solution of oxalic and phosphoric acid in distilled/deionised water to the aqueous medium, which has a conductivity of under 40 μS/cm, in an approximate proportion of oxalic acid between 0.18 and 0.035 moles and phosphoric acid between 1.28 and 2.5 moles per solution liter.

2. The process of claim 1 wherein the solution is added to the aqueous medium following the ion exchange phase between the cationic and anionic resins with the aqueous medium.

3. The process of claim 2 wherein if the electroerosion machine works with Fe or Al parts, approximately 7 ml of the solution is added to the aqueous medium.

4. The process of claim 1, wherein if the electroerosion machine works with Cu parts, approximately 1.5 ml solution is added to the aqueous medium.

5. The process of claim 1, wherein the solution is added to the purification circuit, in the receiving tank of the aqueous medium.

6. The process of claim 1, wherein the solution, in deionised water, is 0.025 moles oxalic acid and 1.8 moles phosphoric acid per liter of solution.

7. A deionisation and clarification process for an aqueous medium used in an electroerosion machine comprising: circulating the aqueous medium in purification circuit for the aqueous medium where an ion exchange phase is included between cationic and anionic resins with an aqueous dielectric medium; and adding to the purification circuit a solution consisting essentially of oxalic and phosphoric acid in distilled/deionised water to the aqueous medium, which has a conductivity of under 40 $\mu$S/cm, in an approximate proportion of oxalic acid between 0.18 and 0.035 moles and phosphoric acid between 1.28 and 2.5 moles per solution liter.

8. The process of claim 7 wherein the solution is added to the aqueous medium following the ion exchange phase between the cationic and anionic resins with the aqueous medium.

9. The process of claim 8 wherein if the electroerosion machine works with Fe or Al parts, approximately 7 ml of the solution is added to the aqueous medium.

10. The process of claim 7, wherein if the electroerosion machine works with Cu parts, approximately 1.5 ml solution is added to the aqueous medium.

11. The process of claim 7, wherein the solution is added to the purification circuit, in the receiving tank of the aqueous medium.

12. The process of claim 7, wherein the solution, in deionised water, consists essentially of 0.025 moles oxalic acid and 1.8 moles phosphoric acid per liter of solution.

* * * * *